United States Patent
Otsuka et al.

(10) Patent No.: US 6,579,509 B1
(45) Date of Patent: Jun. 17, 2003

(54) METHOD OF CLEANING OF HARMFUL GAS AND CLEANING APPARATUS

(75) Inventors: Kenji Otsuka, Kanagawa-ken (JP); Naoki Muranaga, Kanagawa-ken (JP); Satoshi Arakawa, Kanagawa-ken (JP); Tomohisa Ikeda, Kanagawa-ken (JP)

(73) Assignee: Japan Pionics Co., Ltd., Tokyo (JP)

( * ) Notice: Subject to any disclaimer, the term of this patent is extended or adjusted under 35 U.S.C. 154(b) by 66 days.

(21) Appl. No.: 09/716,401

(22) Filed: Nov. 21, 2000

(30) Foreign Application Priority Data

Nov. 30, 1999 (JP) .......................... 11-340264

(51) Int. Cl.⁷ .............................. A62D 3/00
(52) U.S. Cl. ................ 423/245.3; 423/245.1; 588/205
(58) Field of Search ............. 423/210, 245.1, 423/245.3, 215.5; 588/205

(56) References Cited

U.S. PATENT DOCUMENTS

| | | | | |
|---|---|---|---|---|
| 5,102,634 A | * | 4/1992 | Hayashi et al. | 423/210 |
| 5,470,555 A | * | 11/1995 | Shimada et al. | 260/665 R |
| 5,632,964 A | * | 5/1997 | Ishii et al. | 423/210 |
| 6,155,540 A | * | 12/2000 | Takamatsu et al. | 261/138 |

FOREIGN PATENT DOCUMENTS

| | | | | |
|---|---|---|---|---|
| JP | 4-341323 A | * | 11/1992 | B01D/53/36 |
| JP | 8-83772 A | * | 3/1996 | H01L/21/205 |

OTHER PUBLICATIONS

Sobel, Metals and Alloys Dictionary, Chemical Publishing Co., Inc., pp. 149 and 194, 1944.*

* cited by examiner

*Primary Examiner*—Steven Bos
*Assistant Examiner*—Anthony Kuhar
(74) *Attorney, Agent, or Firm*—Oblon, Spivak, McClelland, Maier & Neustadt, P.C.

(57) ABSTRACT

Disclosed is a method for cleaning of the harmful gas, the method comprising mixing harmful gas, discharged from reaction processes using organic metal compounds as the reaction raw materials, with oxygen or air and thereafter bringing the mixture into contact with a catalyst obtained by carrying a noble metal on an inorganic support, a catalyst comprising at least one metal oxide selected from vanadium oxide, chromium oxide, manganese oxide, iron oxide, copper oxide, silver oxide, cobalt oxide and nickel oxide or a catalyst obtained by carrying the metal oxide on an inorganic support, at temperatures between 100° C. and 800° C. to clean the harmful gas. Disclosed also is an apparatus used in the method. The invention ensures that harmful components can be purified in an efficient manner without discharging organic compounds and a large amount of carbon dioxide after the harmful gas is purified, requiring no aftertreatment.

17 Claims, 2 Drawing Sheets

METHOD OF CLEANING OF HARMFUL GAS AND CLEANING APPARATUS

BACKGROUND OF THE INVENTION (1) Field of the Invention

The present invention relates to a method and apparatus for cleaning of the harmful gas discharged from a reaction process using an organic metal compound as a reaction raw material, and, particularly, to a method and apparatus for cleaning of the harmful gas discharged from an MOCVD (Metal Organic Chemical Vapor Deposition) process, other CVD processes or the like in semiconductor-manufacturing processes.

(2) Description of the Prior Art

Materials constituting an insulated thin film of a semiconductor device include $SiO_2$ for a gate insulated film, $Si_3N_4$ for a capacitor insulated film, PSG (phosphorous/silicon/glass) and BPSG (boron/phosphorous/silicon/glass) for a layer insulated film and the like. Gaseous raw materials such as $SiH_4$, $NH_3$, $PH_3$ and $B_2H_6$ have been used as materials for producing these films in CVD apparatus. With progresses in three-dimensional devices and multilayer interconnection, there is an increased demand for flattening of an insulated film. The adoption of CVD processes using, as starting material, a liquid organic metal compound is going to start, the liquid organic metal compound including tetraethoxysilane ($Si(OC_2H_5)_4$), trimethoxyboron ($B(OCH_3)_3$) and trimethoxyphosphorous ($P(OCH_3)_3$) which are resistant to failures such as voids and enables the formation of high quality thin film. In addition, new types of thin film such as a $Ta_2O_5$ film having a dielectric constant several times that of $SiO_2$ have been developed. As the raw material of the $Ta_2O_5$ film, pentaethoxytantalum ($Ta(OC_2H_5)_5$) which is a liquid organic metal material is used.

Moreover, in recent years, as oxide type dielectric thin films for semiconductor memories, a lead titanate zirconate (PZT) film, barium strontium titanate (BST) film and the like which have a high dielectric constant and high step coverage have been developed and various filming methods relating these films have been examined. As to the raw materials of these films, Pb $(DPM)_2$ (solid raw material) as a Pb source, $Zr(OC(CH_3)_3)_4$ (liquid raw material) as a Zr source, $Ti(OCH(CH_3)_2)_4$ (liquid raw material) as a Ti source, Ba$(DPM)_2$ (solid raw material) as a Ba source and Sr$(DPM)_2$ (solid raw material) as a Sr source are used.

Although as to solid raw materials among these raw materials, high purity raw materials can be obtained by keeping these solid raw materials at high temperatures to sublimate them and supplying the vaporized raw materials, it is very difficult to secure industrially sufficient supply amount. Therefore, these solid raw materials are used by dissolving each of these materials in an organic solvent such as tetrahydrofuran in general. Also, in a multicomponent type MOCVD process as aforementioned, the supply amount of each raw material is decreased. Hence an organic solvent is sometimes added also to the liquid raw material to control the supply amount for the purpose of supplying raw materials quantitatively with high accuracy.

Most of these liquid raw materials, solid raw materials and organic solvents used for these raw materials have high toxicity or have not been confirmed as to whether they are safe or not. It is therefore necessary to clean these materials before these materials are discharged to the air after they are used.

Such a harmful gas as is discharged from MOCVD processes has been usually purified by a wet method, dry method or combustion method.

For example, as the cleaning method using a wet method, a method has been practiced in which harmful gas containing an alkoxide is brought into contact with an aqueous solution containing an alkaline component to absorb and decompose the harmful gas thereby cleaning the gas.

As the cleaning method using a dry method, a method is known in which harmful gas containing an alkoxide is brought into contact with a cleaning agent obtained by impregnating a metal oxide using, as major components, copper oxide and manganese oxide with an alkali compound, e.g., potassium hydroxide to clean the gas (Japanese Patent Application Laid-Open No.6-327932). Also, a method is known in which harmful gas containing alkyl hydrides such as tert-butylarsine and tert-butylphosphine is brought into contact with a cleaning agent obtained by impregnating a metal oxide using, as major components, copper oxide and manganese oxide with a cobalt compound to clean the gas (Japanese Patent Application Laid-Open No. 7-60054).

Also, as the cleaning method using a combustion method, a cleaning method has been practiced in which harmful gas containing organic metal compounds is introduced into a flame of flammable gas, e.g., propane, and oxygen or air to burn the harmful gas.

Moreover, as a method for cleaning of the harmful gas containing organic metal compounds and organic solvents, a cleaning method is known in which the harmful gas containing harmful components is brought into contact with, for example, activated carbon or synthetic zeolite such as a molecular sieve to adsorb these harmful components.

However, the aforementioned cleaning method using the wet method has the drawback that the apparatus is large-sized and the aftertreatment of the used absorbing solution is troublesome.

The cleaning method using the dry method described in Japanese Patent Application Laid-Open No. 6-327932 has the drawback that methanol and ethanol produced by the cleaning of the alkoxide cannot be caught though metals contained in the alkoxide can be caught in the cleaning agent. The cleaning method using the dry method described in Japanese Patent Application Laid-Open No. 7-60054 has the drawback that butane and butene cannot be caught similarly to the above case.

The cleaning method using the combustion method has such a disadvantage that it requires high energy cost and a large amount of carbon dioxide is discharged since the state of burning must be maintained also during stand-by time when the harmful gas is not treated.

Moreover, the method for cleaning of the harmful gas containing organic metal compounds and organic solvents by using an adsorbent such as activated carbon or synthetic zeolite poses the problem that harmful components which have been once adsorbed dissociate depending upon treating conditions and the type of harmful component and the problem that aftertreatments such as incineration of the adsorbent after the cleaning of the harmful gas are troublesome. Further, when cyclic ethers such as tetrahydrofuran are contained as the harmful components, they produce peroxides in the presence of oxygen. Therefore, in the case of a large throughput, there is a fear that the aftertreatments are accompanied with risks.

SUMMARY OF THE INVENTION

Accordingly, an object of the present invention is to solve the aforementioned problems and to provide a method and apparatus for cleaning of the harmful gas, the method and the apparatus ensuring that harmful components can be purified in an efficient manner without discharging organic compounds and a large amount of carbon dioxide after the cleaning process and no aftertreatment is required when harmful gas discharged from, for example, semiconductor-manufacturing processes using organic metal compounds as reaction raw materials is purified.

The inventors of the present invention have conducted earnest studies to solve these problems and, as a result, found that harmful components can be efficiently converted into metal oxides, water and carbon dioxide to clean without discharging organic compounds and a large amount of carbon dioxide after the cleaning process and no aftertreatment is required by bringing the harmful gas discharged from reaction processes such as semiconductor-manufacturing processes using organic metal compounds as the reaction raw materials into contact with a catalyst obtained by carrying a noble metal on an inorganic support, a catalyst comprising of a metal oxide such as vanadium oxide, chromium oxide, manganese oxide, iron oxide, copper oxide, silver oxide cobalt oxide or nickel oxide or a catalyst obtained by carrying each of these metal oxides on an inorganic support to run catalytic combustion. The present invention was thus completed.

Accordingly the present invention resides in a method for cleaning of the harmful gas, the method comprising mixing harmful gas, discharged from reaction processes using organic metal compounds as the reaction raw materials, with oxygen or air and thereafter bringing the mixture into contact with a catalyst, obtained by carrying a noble metal on an inorganic support, at temperatures between 100° C. and 800° C. to clean the harmful gas.

Also, the present invention resides in a method for cleaning of the harmful gas, the method comprising mixing harmful gas, discharged from reaction processes using organic metal compounds as the reaction raw materials, with oxygen or air and thereafter bringing the mixture into contact with a catalyst comprising at least one metal oxide selected from vanadium oxide, chromium oxide, manganese oxide, iron oxide, copper oxide silver oxide, cobalt oxide and nickel oxide or a catalyst obtained by carrying the metal oxide on an inorganic support, at temperatures between 100° C. and 800° C. to clean the harmful gas.

Also, the present invention resides in an apparatus for cleaning of the harmful gas discharged from reaction processes using organic metal compounds as the reaction raw materials, the apparatus comprising a pipe for introducing harmful gas, a pipe for introducing oxygen or air, a cleaning column which is connected to said two introduction pipes and filled with a catalyst obtained by carrying a noble metal on an inorganic support, a means for heating the cleaning column and an exhaust pipe for discharging the purified gas discharged from the cleaning column.

Further, the present invention resides in an apparatus for cleaning of the harmful gas discharged from reaction processes using organic metal compounds as the reaction raw materials, the apparatus comprising a pipe for introducing harmful gas, a pipe for introducing oxygen or air, a cleaning column which is connected to said two introduction pipes and filled with a catalyst comprising at least one metal oxide selected from vanadium oxide, chromium oxide, manganese oxide, iron oxide, copper oxide silver oxide cobalt oxide and nickel oxide or with a catalyst obtained by carrying the metal oxide on an inorganic support, a means for heating the cleaning column and an exhaust pipe for discharging the cleaned gas discharged from the cleaning column.

DETAILED DESCRIPTION OF THE INVENTION

Figure 1:
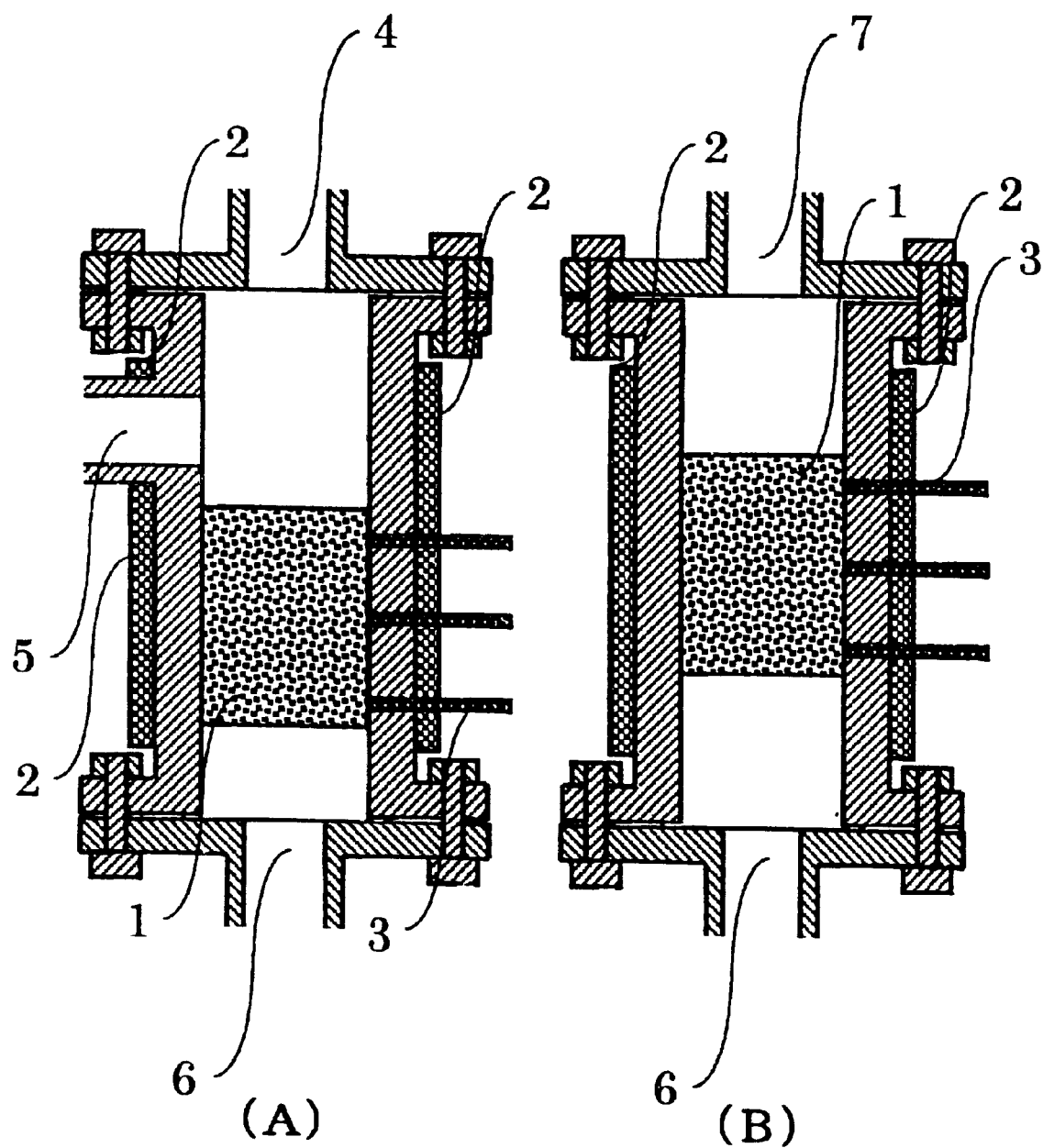
FIG. 1(A) is a sectional view showing an example of a cleaning column used in the present invention (a system in which harmful gas is mixed with oxygen or air in the cleaning column) and FIG. 1(B) is a sectional view showing an example of a cleaning column used in the present invention (a system in which harmful gas is mixed with oxygen or air just before the cleaning column)

The cleaning method and apparatus according to the present invention are applied to the cleaning of harmful gas discharged from reaction processes using organic metal compounds as the reaction raw materials, namely harmful gas containing organic metal compounds and, as required, organic solvents in gas such as nitrogen, argon, helium and hydrogen.

Specifically, in the cleaning method of the present invention, harmful gas discharged from reaction processes using organic metal compounds as the reaction raw materials is mixed with oxygen or air and thereafter the mixture is bought into contact with a catalyst, obtained by carrying a noble metal on an inorganic support, a catalyst comprising at least one metal oxide selected from vanadium oxide, chromium oxide, manganese oxide, iron oxide, copper oxide silver oxide cobalt oxide and nickel oxide or a catalyst obtained by carrying the metal oxide on an inorganic support, at temperatures between 100° C. and 800° C. to oxidize the harmful gas.

Also, the cleaning apparatus of the present invention is used for cleaning of the harmful gas discharged from reaction processes using organic metal compounds as the reaction raw materials, the apparatus comprising a pipe for introducing the harmful gas, a pipe for introducing oxygen or air, a cleaning column which is connected to the two introduction pipes and filled with the aforementioned catalyst, a means for heating the cleaning column and an exhaust pipe for discharging the cleaned gas from the cleaning column.

In the present invention, examples of the organic metal compound as the reaction raw material may include alkoxides, which are liquids at ambient temperature, such as tetra-isopropoxytitanium ($Ti(OCH(CH_3)_2)_4$), tetra-n-propoxytitanium ($Ti(OC_3H_7)_4$), tetra-tert-butoxyzirconium ($Zr(OC(CH_3)_3)_4$), tetra-n-butoxyzirconium ($Zr(OC_4H_9)_4$), tetramethoxyvanadium ($V(OCH_3)_4$), trimethoxyvanadyl oxide ($VO(OCH_3)_3$), pentaethoxyniobium ($Nb(OC_2H_5)_5$), pentaethoxytantalum ($Ta(OC_2H_5)_5$), trimethoxyboron ($B(OCH_3)_3$), tri-isopropoxyaluminum ($Al(OCH(CH_3)_2)_3$), tetraethoxysilane ($Si(OC_2H_5)_4$), tetraethoxygermanium ($Ge(OC_2H_5)_4$), tetramethoxytin ($Sn(OCH_3)_4$), trimethoxyphosphorous ($P(OCH_3)_3$), trimethoxyphosphine oxide ($PO(OCH_3)_3$), triethoxyarsenic ($As(OC_2H_5)_3$) and triethoxyantimony ($Sb(OC_2H_5)_3$).

In addition to the above compounds, organic metal compounds, which are liquids at ambient temperature, such as trimethylaluminum ($Al(CH_3)_3$), dimethylaluminum halide ($Al(CH_3)_2H$), tri-isobutylaluminum ($Al(iso-C_4H_9)_3$), hexafluoroacetylacetone copper vinyltrimethylsilane $((CF_3CO)_2CHCu.CH_2CHSi(CH_3)_3)$, hexafluoroacetylacetone copper allyltrimethylsilane $((CF_3CO)_2 CHCu.CH_2CHCH_2Si(CH_3)_3)$, bis(isopropylcyclopentadienyl)tungsten dihalide $((iso-C_3H_7C_5 H_5)_2WH_2)$, tetradimethylaminozirconium $(Zr(N(CH_3)_2)_4)$, pentadimethylaminotantalum $(Ta(N(CH_3)_2)_5)$, pentadiethylaminotantalum $(Ta(N(C_2H_5)_2)_5)$, tetradimethylaminotitanium $(Ti(N(CH_3)_2)_4)$ and tetradiethylaminotitanium $(Ti(N(C_2H_5)_2)_4)$ may also be used.

Further, examples of the organic metal compound may include bis(2,2,6,6,-tetramethyl-3,5heptane dionite)barium $(Ba((C(CH_3)_3)_2C_3HO_2)_2)$, bis(2,2,6,6,-tetramethyl-3, 5heptane dionite)strontium $(Sr((C(CH_3)_3)_2C_3HO_2)_2)$, tetra (2,2,6,6,-tetramethyl-3,5heptane dionite)titanium $(Ti((C (CH_3)_3)_2C_3HO_2)_4)$, tetra(2,2,6,6-tetramethyl-3,5heptane dionite) zirconium $(Zr((C(CH_3)_3)_2C_3HO_2)_4)$, bis(2,2,6,6,-tetramethyl-3,5heptane dionite) lead $(Pb((C(CH_3)_3)_2 C_3HO_2)_2)$, bis(ethylcyclopentadienyl)ruthenium $(Ru (C_5H_4C_2H_5)_2)$, bis(cyclopentadienyl)barium $(Ba(C_5H_5)_2)$, bis(cyclopentadienyl)strontium $(Sr(C_5H_5)_2)$, hexacarbonylmolybdenum $(Mo(CO)_6)$ and dimethylpentoxygold $(Au (CH_3)_2(OC_5H_7))$ which are respectively solid at ambient temperature.

The organic solvent used as the solvent for the organic metal compound is also a harmful component which is an object to be purified in the present invention and generally has a boiling point of 40° C. to 140° C. Given as examples of such an organic compound are ethers such as propyl ether, methyl butyl ether, ethyl propyl ether, ethyl butyl ether, trimethylene oxide, tetrahydrofuran and tetrahydropyran; alcohols such as methyl alcohol, ethyl alcohol, propyl alcohol and butyl alcohol; ketones such as acetone, ethyl methyl ketone, iso-propyl methyl ketone and iso-butyl methyl ketone; amines such as propylamine, butylamine, diethylamine, dipropylamine and triethylamine; and esters such as ethyl acetate, propyl acetate and butyl acetate. In addition, hexane, heptane or the like may be used.

As the catalyst used to clean harmful gas in the cleaning method and apparatus of the present invention, a catalyst produced by carrying a noble metal such as ruthenium, rhodium, palladium or platinum on an inorganic support, a catalyst comprising a metal oxide such as vanadium oxide, chromium oxide, manganese oxide, iron oxide, copper oxide, silver oxide, cobalt oxide or nickel oxide or a catalyst produced by carrying each of these metal oxides on an inorganic support is used. As the inorganic support, those produced by molding alumina, silica, zirconia, titania, silica alumina, diatomaceous earth or the like into a honeycomb form, spheroidal form, column form or the like may be exemplified.

Although commercially available products may be used as the catalyst produced by carrying a noble metal on an inorganic support, those prepared through such processes as the hydrogenation reduction comprising impregnating a support with an aqueous solution of a noble metal salt may be used. In the present invention, a catalyst produced by carrying two or more of the aforementioned noble metals on an inorganic support may also be used.

Examples of the catalyst comprising a metal oxide may include VO, $V_2O_3$, $VO_2$, $V_2O_5$, CrO, $Cr_2O_3$, $CrO_2$, $Cr_2O_5$, $CrO_3$, MnO, $Mn_3O_4$, $Mn_2O_3$, $MnO_2$, FeO, $Fe_3O_4$, $Fe_2O_3$, $Cu_2O$, CuO, $Cu_2O_3$, $Ag_2O$, AgO, $Ag_2O_3$, CoO, $Co_2O_3$, $Co_3O_4$ and NiO. These metal oxides may be used either singly or as a mixture of two or more. As the mixture, $Mn_2O_3/CuO$ or $Mn_2O_3/Fe_2O_3$ may be used.

As these metal oxides, commercially available products maybe used. Also, there are used, as oxides produced by adding an alkali such as sodium hydroxide, potassium hydroxide, sodium carbonate, potassium carbonate, sodium bicarbonate, potassium bicarbonate or ammonia to a metal salt such as a nitrate, sulfate, chloride or organic acid salt to precipitate an intermediate of a hydroxide or oxide and by mold-baking the resulting precipitate. A binder is preferably added in the preparation of the catalyst to improve the moldability and molding strength of the catalyst. As such a binder, an alumina sol and silica sol may be exemplified. When the binder is added, the amount of the binder is generally 10 wt % or less and preferably 5 wt % or less based on the total weight of the catalyst.

As the catalyst in which the aforementioned metal oxide is carried on an inorganic support, commercially available products may be used. There are used, as those prepared by impregnating a support with, for example, a nitrate or organic acid salt of a metal which is in a liquid state and thereafter by heat-decomposing the salt in an air stream or in a stream of inert gas such as nitrogen to produce a metal oxide. It is to be noted that a catalyst produced by carrying two or more metal oxides on an inorganic support may be used.

No particular limitation is imposed on the shape and size of the catalyst. As examples of the shape, a sphere form, column form, cylindrical form and granular form are given. As to the size, catalysts having a diameter of 0.5 to 10 mm in the case of a sphere form, catalysts having a diameter of 0.5 to 10 mm and a height of 2 to 20 mm in the case of a column form and catalysts having a size of about 0.84 to 5.66 mm in terms of sieve opening in the case of an undefined form such as a granular form are preferable. The packing density when the catalyst is filled in the cleaning column is generally 0.4 to 2.0 g/ml though it depends upon the shape and preparation method of the catalyst.

The method and apparatus for cleaning of the harmful gas according to the present invention will be hereinafter explained with reference to the appended FIG. 1 and FIG. 2, which, however, are not intended to be limiting of the present invention.

The cleaning apparatus of the present invention is used for cleaning of the harmful gas discharged from reaction processes using organic metal compounds as the reaction raw materials, the apparatus comprising a pipe for introducing the harmful gas, a pipe for introducing oxygen or air, a cleaning column which is connected to the two introduction pipes and filled with a catalyst, a means for heating the cleaning column and an exhaust pipe for discharging the cleaned gas from the cleaning column. As an example of the cleaning column, a cleaning column as shown in FIG. 1 may be given.

In FIG. 1(A), harmful gas is mixed with oxygen or air in the cleaning column and thereafter the mixture gas is brought into contact with a catalyst 1 in said cleaning column to clean harmful components. On the other hand, in FIG. 1(B), harmful gas is mixed with oxygen or air just before the cleaning column and thereafter the mixture gas is introduced into the cleaning column where the mixture gas is brought into contact with the catalyst 1 to clean harmful components. No particular limitation is imposed on a material for the cleaning column as far as it is provided with resistance to corrosion and heat. As the material for the cleaning column, stainless steel such as SUS316 or SUS316L is usually used although carbon steel, manganese steel, chrome steel, molybdenum steel or stainless steel may be used.

The shape of the cleaning column is generally a column form. As to the size of the column, generally the inside diameter is 10 to 500 mm and the length is about 20 to 2000 mm. The packing length of the catalyst filled in the cleaning column is generally about 10 to 1000 mm and preferably about 50 to 500 mm. When the packing length of the catalyst is less than 10 mm, harmful gas is insufficiently purified whereas when the packing length exceeds 1000 mm, the pressure drop increases. As the means for heating the cleaning column, usually a heater 2 is installed on the outside of the cleaning column as shown in FIG. 1 and the temperature is controlled by a temperature sensor 3 and an external control unit. Using a multi-divided heater as the heater for the cleaning column, the temperature can be controlled. In FIG. 1, the symbols 4 to 7 represent an introduction port (4) for introducing harmful gas, an introduction port (5) for introducing oxygen or air and, an discharge port (6) for purified gas, an introduction port (7) for introducing mixture gas of the harmful gas and oxygen or air respectively.

In the apparatus for cleaning of the harmful gas according to the present invention, it is preferable to dispose a filter in the stage before and/or after the cleaning column to catch powders such as metals and metal oxides, generated in a MOCVD process and the like, in the stage before the cleaning column thereby preventing an increase in pressure drop or to prevent external discharge of powders such as metal oxides produced in the cleaning column. It is also desirable to dispose a cooler in the stage after the cleaning column to cool the purified gas discharged from the cleaning column promptly. An example of such cleaning apparatus is shown in FIG. 2.

In the cleaning method of the present invention, harmful gas discharged from reaction processes using an organic metal compounds as the reaction materials is mixed with oxygen or air and then the mixture gas is brought into contact with the aforementioned catalyst at 100° C. to 800° C. to convert harmful components by catalytic oxidation into metal oxides, water and carbon dioxide thereby cleaning the harmful gas. The aforementioned cleaning apparatus is generally used to practice the cleaning method of the present invention. An example of such cleaning apparatus is shown in FIG. 2.

Figure 2:
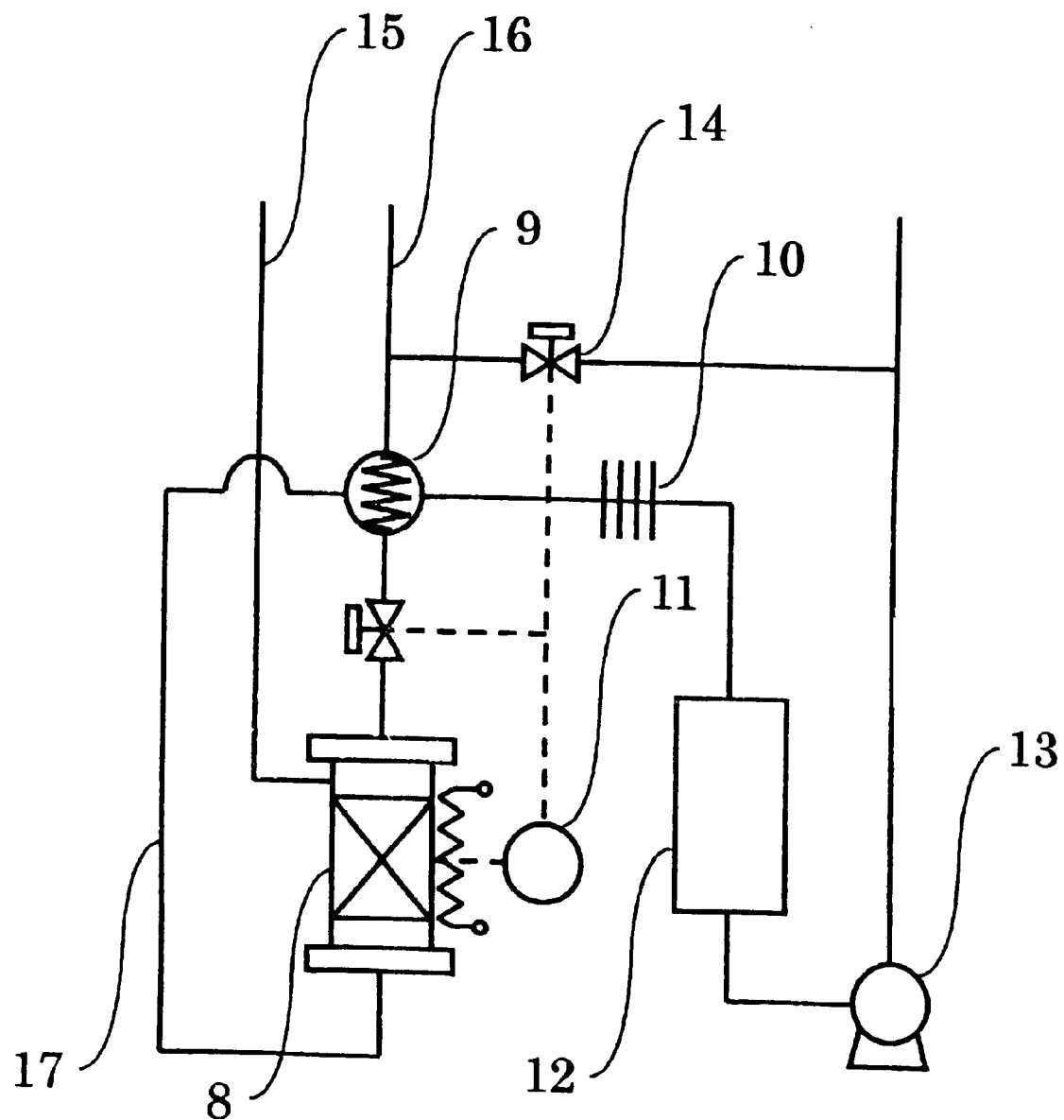
FIG. 2 is a structural view showing an example of apparatus for cleaning of the harmful gas according to the present invention.

In the cleaning apparatus shown in FIG. 2, harmful gas discharged from an MOCVD process or the like is introduced through an harmful gas-introduction pipe 16 to a cleaning column 8 while oxygen or air is introduced through an oxygen-or air-introduction pipe 15 to the cleaning column 8. The harmful gas sometimes contains the aforementioned organic solvents as harmful components in addition to organic metal compounds and the reaction products of these compounds. The mixture gas introduced into the cleaning column is controlled at a temperature of 100 to 800° C. in a temperature controller 11 and is in contact with the catalyst in the cleaning column to oxidize and clean the harmful components. The purified gas discharged from the cleaning column 8 goes through an exhaust pipe 17, is allowed to pass through a heat exchanger 9, a cooler 10, a filter 12 and a blower 13 and then discharged to the air.

The temperature at which the aforementioned mixture gas is in contact with the catalyst is preferably 100° C. to 800° C. and more preferably 200° C. to 500° C. although it depends upon the type and qualities of organic metal compound.

The flow rate of the harmful gas is generally 5 to 5000 ml/min. The proportion of oxygen or air to be mixed with the harmful gas is controlled such that the concentration of harmful components after the harmful gas is mixed with oxygen or air is 2 vol % or less to avoid the range of explosion although it depends upon the type of harmful gas. Time during which the harmful gas after being mixed with oxygen or air is in contact with the catalyst is generally 0.01 to 5 seconds and preferably 0.1 to 2 seconds. The packing length of the catalyst is determined in consideration of these conditions.

The temperature at which the harmful gas is in contact with the catalyst is preferably 100° C. to 800° C. even if organic solvents are contained as harmful components. However, in the condition that no harmful gas is introduced, namely, during stand-by time, it is preferable to keep the temperature of the catalyst within a range from a temperature higher by 100° C. than the ignition point of the organic solvent to be purified to a temperature lower by 100° C. than that ignition point. For example, when gas containing tetrahydrofuran as the organic solvent is purified, the temperature of the catalyst during stand-by time is preferably kept at 221° C. to 421° C. since the ignition point of tetrahydrofuran is 321° C. When the temperature of the catalyst during stand-by time is kept at a temperature lower than the ignition point by 100° C. or more, the efficiency of the cleaning of harmful gas is decreased whereas when the temperature of the catalyst during stand-by time is kept at a temperature higher than the ignition point by 100° C. or more, the temperature is excessively raised due to heat generated in the cleaning, affording possibility for damaging the cleaning apparatus. Even in the case where organic solvents are contained as harmful components, a control is usually made such that the concentration of harmful components after the harmful gas is mixed with oxygen or air is 2 vol % or less.

As aforementioned in detail, the present invention ensures that harmful gas discharged from semiconductor-manufacturing processes and the like can be purified in an efficient manner without discharging organic compounds and a large amount of carbon dioxide after the harmful gas is purified, requiring no aftertreatment.

The present invention will be hereinafter explained in more detail by way of examples, which are not intended to be limiting of the present invention.

EXAMPLE 1

A cleaning apparatus as shown in FIG. 2 was manufactured as the apparatus for cleaning of the harmful gas. As the cleaning column, a type having the same column form as that shown in FIG. 1(A), made of SUS316L and having an inside diameter of 40 mm and a length of 500 mm was used. A catalyst (manufactured by Nissan Gardler Catalyst) obtained by carrying palladium on a spherical alumina support was filled in the cleaning column such that the packing length was 300 mm.

The catalyst in the cleaning column was heated to 300° C. Then nitrogen (flow rate: 140 ml/min) containing tetraethoxysilane (flow rate: 1.63 ml/min) as the harmful gas discharged from a semiconductor process was introduced into the cleaning column through a harmful gas-introducing pipe while dry air (flowrate: 18200 ml/min) was introduced into the cleaning column to oxidize tetraethoxysilane as a harmful component catalytically thereby cleaning the harmful components. In this condition, the cleaning of the harmful gas was continued for 24 hours during which apart of the purified gas discharged from a discharge port of the cleaning column was sampled at intervals of 2 hours and analyzed the sample by FT-IR (Fourier-transform infrared spectrophotometer). As a result, only carbon dioxide and water were detected as the compound converted from tetraethoxysilane.

EXAMPLE 2

An operation for the cleaning of harmful gas containing tetraethoxysilane was carried out for 24 hours in the same manner as in Example 1 except that the catalyst obtained by carrying palladium on a spherical alumina support used in Example 1 was replaced by a catalyst (manufactured by Nissan Gardler Catalyst) made of $Mn_2O_3$—$CuO$. During operation, a part of the purified gas discharged from the discharge port of the cleaning column was sampled at intervals of 2 hours and analyzed by FT-IR (Fourier-transform infrared spectrophotometer) in the same manner as in Example 1. As the result, only carbon dioxide and water were detected as the compound converted from tetraethoxysilane.

EXAMPLE 3

Using the same cleaning apparatus as in Example 1, a test for cleaning bis(2,2,6,6-tetramethyl-3,5heptane dionite) strontium ($Sr(DPM)_2$) dissolved in tetrahydrofuran was carried out.

Tetrahydrofuran in which 0.2 mol % of $Sr(DPM)_2$ was dissolved was forcedly fed by He gas to a vaporizing and supplying unit where the mixture was heated and vaporized to prepare harmful gas such that the concentration of $Sr(DPM)_2$ was 100 ppm. After the temperature of the catalyst in the cleaning column was heated to 300° C., the harmful gas (flow rate: 18.3 ml/min) was introduced into the cleaning column from the harmful gas-introduction pipe while dry air (flow rate: 18000 ml/min) was introduced into the cleaning column to oxidize $Sr(DPM)_2$ and tetrahydrofuran catalytically, which were harmful components, thereby cleaning the harmful components.

An operation for the cleaning of the harmful gas containing $Sr(DPM)_2$ and tetrahydrofuran was carried out for 24 hours in the same manner as in Example 1. During operation, a part of the purified gas discharged from the discharge port of the cleaning column was sampled successively and analyzed by FT-IR (Fourier-transform infrared spectrophotometer). Also, the sampled purified gas was allowed to be absorbed in ultra pure water to prepare a sample solution, which was then subjected to quantitative analysis for strontium by using an ICP quantometer. As a result, only carbon dioxide and water were detected as the compound converted from $Sr(DPM)_2$ and tetrahydrofuran by the FT-IR. Also as a result of the quantitative analysis of strontium by ICP emission spectral analysis, the amount of strontium was less than the lower limit (1 ppb) of detection.

EXAMPLES 4 to 14

Operations for the cleaning of harmful gas containing $Sr(DPM)_2$ and tetrahydrofuran were carried out in the same manner as in Example 3 except that the catalyst used in Example 3 was replaced by a commercially available catalyst obtained by carrying ruthenium on an alumina support (Example 4), catalyst obtained by carrying rhodium on an alumina support (Example 5), catalyst obtained by carrying platinum on an alumina support (Example 6), $V_2O_3$ catalyst (Example 7), $Cr_2O_3$ catalyst (Example 8), $Mn_2O_3$ catalyst (Example 9), $Fe_2O_3$ catalyst (Example 10), $CuO$ catalyst (Example 11), $Ag_2O$ catalyst (Example 12), $NiO$ catalyst (Example 13) and $CoO$ catalyst (Example 14) respectively.

As a result, only carbon dioxide and water were detected as the compound converted from $Sr(DPM)_2$ and tetrahydrofuran in any of these cases.

EXAMPLES 15–17

Operations for the cleaning of harmful gas were carried out using a catalyst, obtained by carrying palladium on a spherical alumina support, in the same manner as in Example 3 except that the harmful components of the harmful gas were replaced by $TiO(DPM)$ and tetrahydrofuran (Example 15), $Zr(DPM)_4$ and n-butyl acetate (Example 16) and $Pb(DPM)_2$ and n-butyl acetate (Example 17) respectively. In the case of containing n-butyl acetate as the harmful component, the temperature of the catalyst filled in the cleaning column was set to 400° C. As a result, only carbon dioxide and water were detected as the materials converted from the harmful gas in any of these cases.

Comparative Example 1

An operation for the cleaning of harmful gas containing tetraethoxysilane was carried out in the same manner as in Example 1 except that the catalyst obtained by carrying palladium on a spherical alumina support was replaced by a cleaning agent produced by impregnating a metal oxide using copper oxide and manganese oxide as major components with potassium hydroxide (ratio of $CuO:MnO_2:KOH=$ 4:6:3) and the temperature at which the harmful gas containing tetraethoxysilicon was in contact with the cleaning agent was changed to ambient temperature. In order to detect the break-through of harmful components, a detecting agent produced by impregnating an alumina ball with a chemical which is discolored by tetraethoxysilane was disposed downstream of the cleaning agent.

A part of the purified gas discharged from the discharge port of the cleaning column was sampled two hours after the harmful gas containing tetraethoxysilicon started flowing and was subjected to measurement using a gas detecting tube (manufactured by Gastech) for ethyl alcohol with the result that about 3500 ppm of ethyl alcohol was detected. In this case, the detecting agent for tetraethoxysilane was not discolored. Therefore, it is confirmed that there was no break-through of tetraethoxysilane.

What is claimed is:

1. A method comprising,
   mixing a harmful gas, discharged from one or more reaction processes using organic metal compounds and one or more organic solvents as a reaction raw material, with oxygen or air and thereafter
   bringing the mixture into contact with a catalyst comprising a noble metal carried on an inorganic support, at temperatures between 100° C. and 800° C. to clean the harmful gas,
   wherein the temperature of the catalyst is, during stand-by time, from 100° C. higher to 100° C. lower than the ignition point of the organic solvent.

2. A method comprising,
   mixing a harmful gas, discharged from one or more reaction processes using organic metal compounds and one or more organic solvents as a reaction raw material, with oxygen or air and thereafter
   bringing the mixture into contact with a catalyst comprising at least one metal oxide selected from the group consisting of vanadium oxide, chromium oxide, manganese oxide, iron oxide, copper oxide, silver oxide, cobalt oxide and nickel oxide, or a catalyst comprising the metal oxide carried on an inorganic support, at temperatures between 100° C. and 800° C. to clean the harmful gas,
   wherein the temperature of the catalyst is, during stand-by time, from 100° C. higher to 100° C. lower than the ignition point of the organic solvent.

3. The method according to claim 1, wherein the harmful gas comprises one or more organic metal compounds.

4. The method according to claim 1, wherein the noble metal is at least one selected from the group consisting of ruthenium, rhodium, palladium and platinum.

5. The method according to claim 1, wherein the inorganic support is at least one selected from the group consisting of alumina, silica, zirconia, titania, silica alumina and diatomaceous earth.

6. The method according to claim 1, wherein the harmful gas is filtered to remove fine powders.

7. The method according to claim 1, wherein the purified gas is cooled.

8. The method according to claim 1, wherein the organic metal compound is at least one selected from the group consisting of tetraethoxysilane, bis(2,2,6,6-tetramethyl-3,5heptane dionite)barium, bis(2,2,6,6-tetramethyl-3,5heptane dionite)strontium, tetra(2,2,6,6-tetramethyl-3,5heptane dionite)titanium, tetra(2,2,6,6-tetramethyl-3,5heptane dionite)zirconium, bis(2,2,6,6-tetramethyl-3,5heptane dionite)lead, bis(ethylcyclopentadienyl)ruthenium, bis(cyclopentadienyl)barium, bis(cyclopentadienyl)strontium, hexacarbonylmolybdenum and dimethylpentoxygold.

9. The method according to claim 1, wherein the organic solvent is at least one selected from the group consisting of ethers, alcohols, ketones, amines and esters which have a boiling point of 40° C. to 140° C.

10. The method according to claim 1, wherein the organic solvent is tetrahydrofuran.

11. The method according to claim 2, wherein the harmful gas comprises one or more organic metal compounds.

12. The method according to claim 2, wherein the inorganic support is at least one selected from the group consisting of alumina, silica, zirconia, titania, silica alumina and diatomaceous earth.

13. The method according to claim 2, wherein the harmful gas is filtered to remove fine powders.

14. The method according to claim 2, wherein the purified gas is cooled.

15. The method according to claim 2, wherein the organic metal compound is at least one selected from the group consisting of tetraethoxysilane, bis(2,2,6,6-tetramethyl-3,5heptane dionite)barium, bis(2,2,6,6-tetramethyl-3,5heptane dionite)strontium, tetra(2,2,6,6-tetramethyl-3,5heptane dionite)titanium, tetra(2,2,6,6-tetramethyl-3,5heptane dionite)zirconium, bis(2,2,6,6-tetramethyl-3,5heptane dionite)lead, bis(ethylcyclopentadienyl)ruthenium, bis(cyclopentadienyl)barium, bis(cyclopentadienyl)strontium, hexacarbonylmolybdenum and dimethylpentoxygold.

16. The method according to claim 2, wherein the organic solvent is at least one selected from the group consisting of ethers, alcohols, ketones, amines and esters which have a boiling point of 40° C. to 140° C.

17. The method according to claim 2, wherein the organic solvent is tetrahydrofuran.

* * * * *